United States Patent
Bubbico

(10) Patent No.: US 8,763,358 B2
(45) Date of Patent: Jul. 1, 2014

(54) ROTARY TYPE INTERNAL COMBUSTION ENGINE

(76) Inventor: Rocco Luigi Bubbico, Turin (IT)

(*) Notice: Subject to any disclaimer, the term of this patent is extended or adjusted under 35 U.S.C. 154(b) by 118 days.

(21) Appl. No.: 13/579,579

(22) PCT Filed: Feb. 24, 2011

(86) PCT No.: PCT/IB2011/050786
§ 371 (c)(1),
(2), (4) Date: Aug. 17, 2012

(87) PCT Pub. No.: WO2011/104685
PCT Pub. Date: Sep. 1, 2011

(65) Prior Publication Data
US 2012/0312274 A1    Dec. 13, 2012

(30) Foreign Application Priority Data
Feb. 24, 2010  (IT) .............................. TO2010A0135

(51) Int. Cl.
*F02B 57/00*    (2006.01)
(52) U.S. Cl.
USPC .................... 60/39.34; 60/39.44; 60/39.35
(58) Field of Classification Search
CPC ............ F02B 57/00; F01D 1/32; F02C 3/165; F02K 7/005
USPC .................... 60/39.34, 39.35, 39.44
See application file for complete search history.

(56) References Cited

U.S. PATENT DOCUMENTS

| 800,684 | A | * | 10/1905 | Schneider | 60/39.44 |
| 1,149,523 | A | * | 8/1915 | Jerman | 415/173.1 |
| 3,145,533 | A | * | 8/1964 | Ollinger | 60/39.34 |
| 3,804,549 | A | | 4/1974 | Kellenbarger | |
| 3,811,275 | A | | 5/1974 | Mastrobuono | |
| 4,347,698 | A | | 9/1982 | Nelson | |

(Continued)

FOREIGN PATENT DOCUMENTS

| FR | 2229274 A5 | * | 12/1974 | .............. F02B 57/00 |
| WO | WO 2008/057826 A2 | | 5/2008 | |
| WO | WO 2009/019718 A1 | | 2/2009 | |

OTHER PUBLICATIONS

International Search Report for PCT International Application No. PCT/IB2011/050786 mailed Nov. 28, 2011.

(Continued)

*Primary Examiner* — Thai Ba Trieu
*Assistant Examiner* — Ngoc T Nguyen
(74) *Attorney, Agent, or Firm* — RatnerPrestia

(57) ABSTRACT

The engine includes a stator including an inlet to admit a compressed gaseous oxidant flow, and an exhaust to discharge burnt gases; and a rotor mounted in the stator in a fluid-tight manner and rotatable with respect to the stator around a rotation axis. The rotor has an inlet orifice oriented in the axial direction and faces the inlet opening in a manner to receive the compressed air flow, a combustion chamber communicating with the inlet orifice, and an exhaust duct which leads in a transverse direction from the combustion chamber to the periphery of the rotor for discharging burnt gases through the exhaust. The inlet, the combustion chamber and the exhaust duct are arranged in fluid communication with each other during the rotor rotation, without the interposition of valve members. Seal members seal the inlet orifice and the exhaust duct when they face the internal surface of the stator.

15 Claims, 1 Drawing Sheet

(56) References Cited

U.S. PATENT DOCUMENTS 5,282,356 A * 2/1994 Abell ............................ 60/39.35
5,560,196 A * 10/1996 Schlote ........................ 60/39.35
8,333,060 B2 * 12/2012 Witteveen .................... 60/39.34

OTHER PUBLICATIONS

PCT Written Opinion for PCT International Application No. PCT/IB2011/050786 mailed Nov. 28, 2011.

* cited by examiner

ROTARY TYPE INTERNAL COMBUSTION ENGINE

CROSS REFERENCE TO RELATED APPLICATIONS

This application is the U.S. National Phase Application of PCT/IB2011/050786, filed Feb. 24, 2011, which claims priority to Italian Patent Application No. TO2010A000135, filed Feb. 24, 2010, the contents of such applications being incorporated by reference herein.

TECHNICAL FIELD

The present invention refers to a rotary type internal combustion engine.

More specifically, the invention refers to an engine comprising a stator including at least one stator inlet opening intended to admit an operating fluid flow, and at least one stator exhaust opening intended to discharge burnt gases; and a rotor mounted in said stator in a fluid-tight manner and rotatable with respect to said stator around a rotation axis, said rotor having: at least one rotor inlet orifice oriented in an axial direction and intended to face said stator inlet opening in a manner such to receive said operating fluid flow when it is situated at said stator inlet opening, at least one combustion chamber communicating with said at least one rotor inlet orifice, and at least one rotor exhaust duct which leads with an discharge orifice in a transverse direction from said at least one combustion chamber to the periphery of said rotor, and adapted for discharging burnt gases through said stator exhaust opening when said rotor exhaust duct is situated at such stator exhaust opening; whereby said at least one rotor inlet orifice, said at least one combustion chamber and said at least one rotor exhaust duct are arranged for always being in fluid communication with each other during the rotation of said rotor without the interposition of valve means situated among them.

TECHNOLOGICAL BACKGROUND

It is known in the field to use internal combustion engines which operate by means of a fluid and drive a rotary shaft.

The aforesaid engine types can generally be distinguished as engines in which the force originates in cyclical form, as an action of pressure in a volume defined between a fixed part and a movable part, such as those with pistons with alternating motion or with rotary motion, and engines in which the force comes from the reaction of the fluid when it is moved on the rotating parts, arranged either along the motion axis of the fluid (the jets) or transverse thereto (the turbines), due to the speed variation of the fluid subjected to a pressure drop.

The present invention refers to engines of the second type, i.e. rotary type internal combustion engines. These engines have jets arranged inside the circular periphery of the movable part, called the rotor.

Among these engines, some solutions employed up to now consist of installing autonomous jet engines around a wheel and to make the normal thermodynamic cycle occur in each engine; typically such cycle consists of air suction, compression, combustion, expansion and discharge, with the start of tangential thrust applied on the rotor. In other cases, the thrust originates by directly ejecting, from suitable nozzles situated around the circumference of the rotor, compressed fluid sent by a motion-compressor, or generated by a pressure drop. In such applications, the thrusts of the various nozzles occur independent of the angular position thereof. Embodiment examples can be some helicopter rotors, in which the nozzles are placed at the ends of the blades such that the jets create the thrusts, which come to substitute the mechanical drive of the rotor shaft carried out by an internal combustion engine; another typical example is the rotating wheel that is thrust by compressed jets of water, air or vapor.

In other cases, it has been thought to insert the cylinders with the pistons in the rotor; they are arranged radially and connected to the single jet chambers, which are placed inside the rotor, in a manner so as to obtain thermal combustion cycles, with formation of the thrust on the rotor during the gas discharge step; in such case, the cyclical steps are dependent on the angular position of the single chamber.

Generally, the rotary part, or rotor, has complex zones where the compressions of the operating fluid occur, or ducts which bring compressed fluid generated outside the rotor, together with valve systems for regulating the sending of the fluid into the combustion or ejection chamber.

One example of a combustion engine of the type reported above is described in the document WO 2009/019718 A1, which is incorporated by reference. In the aforesaid document, an engine is described that is constituted by a rotor axially mounted on a main shaft; at the periphery of the rotor, there are combustion chambers which are capable of being sealingly closed and are equipped with a respective suction valve, a trigger device and an exhaust valve for a convergent-divergent nozzle. The combustion chambers are filled with pre-compressed air from an external source by means of a rotary joint fixed to the main shaft. The fuel is injected into the compressed air flow through a second channel in the rotary joint, and the fuel-air mixture travels in a sealed environment through passages obtained in the rotor and through the combustion chamber. Subsequently, the suction valve is closed and combustion is triggered in the air/fuel mixture, the exhaust valve is opened and the hot combustion gases are quickly discharged, obliging the rotor to be moved in the opposite direction with an equal and opposite reaction. The process is repeated with the consequent output of continuous power.

SUMMARY OF THE INVENTION

One aspect of the present invention is an engine which is capable of solving the drawbacks of the prior art, and which at the same time can be produced in a simple and economical manner.

A further aspect of the invention is an overall set in which the combustion cycle, or generically the raising of the pressure in an operating fluid, such to be used in the ejection by the suitable chamber for generating thrust on the rotor, occurs in a chamber placed in the stator and/or in the rotor without depending on the actuations of valves or mechanisms—phased with the cycle—which carry out steps of the thermodynamic cycle with the rotor (such as the compression). Not part of the object of the inventive idea is the use of systems for mixing possible fuel or for the ignition of the mixture itself, or for the heating of the fluid to be ejected, which can be of many various types; for example, fuel injectors can be used that are placed on the chambers and regulators can be inserted in the rotor, with small pistons with radial movement driven by a cam fixed on the central shaft; likewise, the rotary part of the electric current generation installation can be arranged in the rotor itself, by using the space in front of the stator as an air gap. The electric current, moreover, can also be the source for heating the fluid in the heating chamber, or even before.

In an aspect of the invention, the thrust force of each jet is created following the simple circular movement of the rotor, which bears therein the pressure chambers and the openings of each chamber for allowing the entrance of the fluid to be treated and for expelling such fluid with suitable speed, according to the laws of thermodynamics. The movement of the rotor is to be associated with a fixed set, the stator, which transfers the operating fluid to the rotor and collects the discharge of the operating element.

This and other aspects are attained by the present invention by means of an engine of the above-specified type, wherein said engine also includes seal means arranged for sealing said at least one rotor inlet orifice and said at least one rotor exhaust duct when they face the internal surface of said stator and for clearing said at least one rotor inlet orifice and said at least one rotor exhaust duct respectively when said at least one rotor inlet orifice faces said at least one stator inlet opening and when said at least one rotor exhaust duct faces said at least one stator exhaust opening and in that said seal means surround said at least one rotor inlet orifice and the discharge orifice of said at least one rotor exhaust duct.

One advantage of the invention is given by the fact that the arrangement of the openings on the rotor and those on the stator is obtained in a manner such that, when they coincide, respectively for allowing fluid entrance or discharge, the fluid can be moved with respect to the rotor in order to enter into the chamber or to generate the thrust, without any aid or movement of doors or valves (i.e. no doors or valves must be actuated).

Another advantage of the invention consists of forming the chamber, or more than one chamber, inside the stator or in the rotor, not on its peripheral face as in the rotary piston engines, thus locally arranging the most suitable material for its strength in working conditions; the process of increasing the temperature and the pressure beyond the level already possessed by the entering fluid is confined to such chamber. Another advantage of the invention consists of positioning the inlet ducts and exhaust ducts with the suitable widths and trajectories for obtaining the best movement of the fluid. In such a manner, the combustion process, or the process for increasing the pressure and temperature of the fluid in the chamber, occurs at a constant volume, contrary to that which occurs in all the processes achieved up to now in jet chambers, or in any case in the fluid reaction chambers with respect to the movable surfaces.

According to another advantageous aspect, the openings of each chamber, whether placed in the stator or in the rotor, are arranged in a manner such that they remain closed by the opposite walls of the opposite part (stationary or rotary), when they do not have to exchange volume from one side to another during a revolution; however, they are clear when they are situated in front of the respective opposite openings, respectively inlet and exhaust openings. The openings on the rotor are surrounded by rings, or contact elements such as piston rings, or with pressure drop seals such as labyrinth seals used in turbines, in a manner so as to attenuate the pressure losses in the chamber in the best possible manner. The new operating fluid flowing out from the stator is in part sent into the volume around the rotor in order to lower the temperature of the parts and exits into the discharge space of the expelled fluid, where it also contributes to improving the chemical reactions in the fluids; the other part of the new operating fluid enters into the combustion chamber and is used for carrying out combustion, or the change of state provided for obtaining the pressure and the temperature. If the chambers are in the rotor, they are suitable for carrying out the ejection with creation of thrust, when during the revolution the exhaust opening of the chamber faces the exhaust space of the stator; if they are in the stator, the compressed fluid in the chamber first passes into the rotor, into the suitable chambers as stated above, when the outlet opening from the chamber encounters the inlet opening of the rotor.

In a further advantageous manner, the surfaces of the rotor and the stator might be formed with fins, in a manner so as to lower the temperatures of the zones deemed necessary.

Based on a further advantageous aspect of the invention, the combustion chamber, which can be arranged as desired, is formed with material resistant to heat and to the other conditions existing therein; it can also be separated with air space from the seat in the rotor or in the stator; it is designed for minimizing the stresses which are generated in the chemical, dynamic and thermal process; that on the rotor has a nozzle such to optimize the outflow of the gases and the generated thrust and can have a device for varying the outflow areas in order to optimize the effects of the pressure and temperature variation. The rotor chamber possesses an opening for the inflow of the operating fluid, coinciding with the relative opening in the rotor and shaped in a manner so as to facilitate the entrance of the fluid and the possible formation of vortices in the chamber, for optimizing the thermal process. The devices for the ignition, the heating and for the inflow of the fuel are then inserted, if necessary for the thermal process, as well as possible sensors for the parameter detection. Likewise, the chamber in the stator can have the same expedients, in addition to the opening where the new fluid enters when the rotor during the revolution arrives with the passage space, which causes the fluid coming from the compressor to move; then, the rotor surface closes such opening, and the step of pressure and temperature increase can take place.

According to another advantageous aspect, the following steps occur in the chamber, during a rotor revolution or part thereof: inflow of operating fluid, generally already compressed, inflow and ignition of fuel if necessary, combustion or increase of pressure and temperature for heating the existing fluid, at constant volume, ejection of the burnt gases or operating fluid. The compression of the fluid starting from static conditions is carried out by a suitable compressor, suitable for the flow rate necessary for the rotor, and connected to the stator in order to insert the operating fluid therein. Another fluid for cooling the hot parts can be made to arrive from suitable openings, or from fans, or from fins placed on the rotor, and sucking from the outside.

It is intended that the enclosed claims constitute an integral part of the technical teachings provided in the present description with regard to the invention.

BRIEF DESCRIPTION OF THE DRAWINGS

Further characteristics and advantages of the invention will be clearer from the following detailed description, given as a merely non-limiting example, with reference to the enclosed drawings, in which.

It will be understood that the drawings referred to herein are not made in scale, except if specifically indicated, the emphasis instead being placed on illustrating the principles according to the present invention.

In addition, the proportions between the elements inferable by the above mentioned drawings are not to be intended as limiting of the actual proportions of a rotary type internal combustion engine according to the present invention.

DETAILED DESCRIPTION OF THE INVENTION

Figure 1:
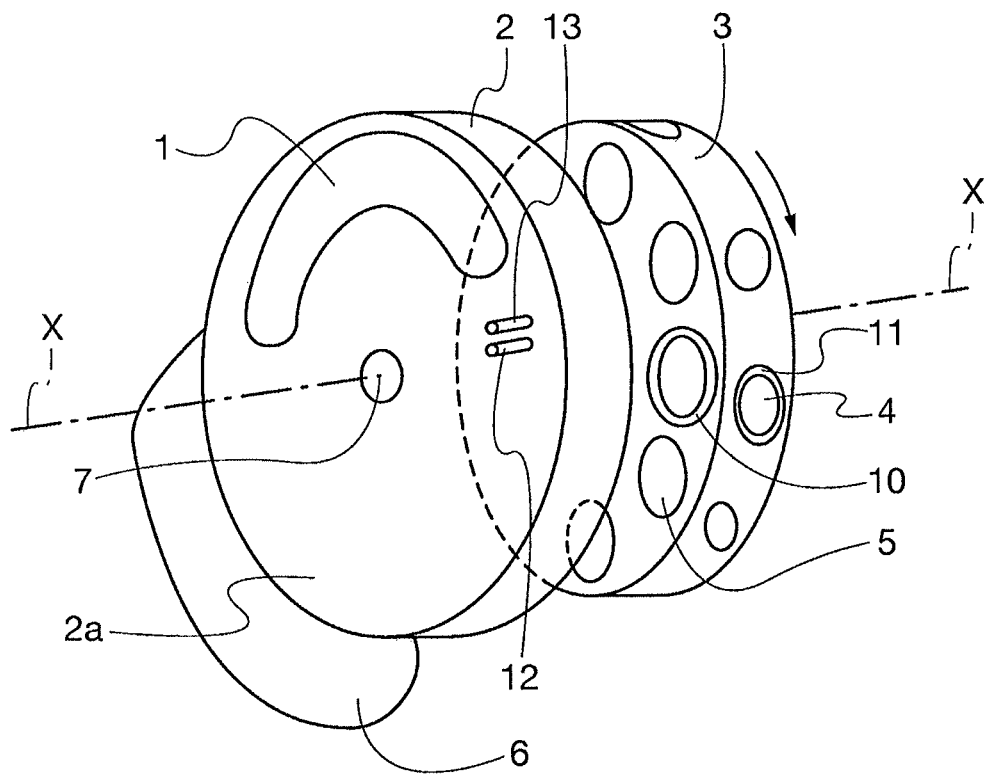
FIG. 1 is an exploded schematic view of an embodiment of a rotary type internal combustion engine according to an aspect of the present invention.
Figure 2:
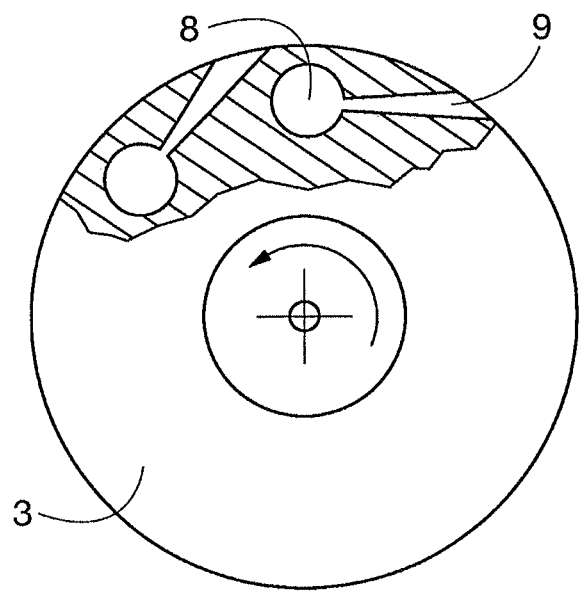
FIG. 2 is a partially schematic view in cross section of a rotor belonging to the engine of FIG. 1.

With regard to the FIGS. 1 and 2, an exemplary embodiment is illustrated of a rotary type internal combustion engine according to the present invention.

In the following detailed description, terms or expressions such as "axial" or "axially", "transverse" or "transversely", "towards the interior/internally" and "towards the exterior/externally" are intended as referred to a rotation axis indicated by the reference X-X in FIG. 1.

The engine includes a fixed part or stator 2 and a movable part or rotor 3 driven in rotation by gas jets.

The stator 2 includes an inlet opening 1 intended to admit a compressed gaseous oxidant flow, and an exhaust opening 6 intended to discharge burnt gases. In the illustrated embodiment, the compressed gaseous oxidant is compressed air, for example fed from a compressor that can be connected to the stator 2 for the fixed part and to the rotor 3 for the movable part. Alternatively, the compressed gaseous oxidant is supplied from a tank mounted on the stator 2. Preferably, the stator 2 comprises a portion 2a having a substantially cup-shaped form with a base and a lateral wall such to define a cavity suitable for housing the rotor 3. More preferably, the stator 2 comprises a closure or cover element coupled with the portion 2a in a manner such that the portion 2a and such closure or cover element form a sealingly-closed casing which encloses the rotor 3. Still more preferably, the stator 2 has a substantially hollow cylindrical shape with circular cross section.

The rotor 3 is mounted in a fluid-tight manner in the stator 2 and is rotatable with respect to the stator 2 around a rotation axis X-X. The rotor 3 has a plurality of inlet orifices 5 orientated in axial direction and facing the inlet opening 1 in a manner such to receive the compressed air flow. In addition, the rotor 3 has a plurality of combustion chambers 8, and each of these communicates with a respective inlet orifice 5. Furthermore, the rotor 3 has a plurality of exhaust ducts 9, and each of these leads in a transverse direction from the combustion chambers 8 to a respective discharge orifice 4 made in the periphery of the rotor 3 and is adapted to discharge burnt gases through an opening 6. In the illustrated embodiment, the rotor 3 is a disc which preferably has a substantially cylindrical shape and is rotatably mounted in the cavity defined by the stator 2. Alternatively, the rotor 3 has a central hub coupled with the stator 2 in a rotatable manner around the rotation axis X-X and a peripheral crown or ring which bears the inlet orifices 5, the combustion chambers 8 and the exhaust ducts 9; in the latter case, the central hub is connected with the peripheral ring by means of a plurality of radial spokes.

As is visible, the inlet opening 1 and the inlet orifices 5 are situated in an eccentric position with respect to the rotation axis X-X. For example, the inlet orifices 5 are angularly equidistant with respect to the rotation axis X-X. Preferably the inlet orifices 5 are situated on a face of the rotor 3 turned in axial direction towards the stator 2. In addition, the discharge orifices 4 are for example situated on the lateral surface of the rotor 3 and preferably have a substantially circular section.

In a preferred manner, the engine also comprises a driven shaft capable of being driven in rotation by the rotor 3. For example the driven shaft can be directly connected with the rotor 3 in a manner such to be integral in rotation therewith or it can be connected with the rotor 3 through a suitable transmission system, such as a gear mechanism or the like. The driven shaft is intended to deliver an output torque, generated by the rotation of the rotor 3 and imparted by the engine.

Each inlet orifice 5, the respective combustion chamber 8 and the respective exhaust duct 9 are arranged to always be in fluid communication with each other during the rotation of the rotor, without the interposition of valve members situated among them.

In addition, the engine includes seal members 10 and 11 (schematically illustrated in FIG. 1 are only a seal member 10 related to one of the inlet orifices 5, and another seal member 11 related to one of the exhaust ducts 9), arranged for sealing each of the inlet orifices 5 and each of the exhaust ducts 9, respectively, when they face the internal surface of the stator 2. For example, the seal members are gaskets 10 and 11, preferably made of a material that is resistant to friction and heat which is, for example, driven in contact with the internal surfaces of the stator 2 by springs or elastic members. The gaskets 10 and 11 surround the inlet orifices 5 and the discharge orifices 4 of the exhaust ducts 9. For example, the aforesaid gaskets are piston rings. Alternatively, the seal members 10 and 11 are labyrinth type seals.

Preferably, the combustion chambers 8 are obtained along a circumference defined in the rotor 3, e.g. at a face thereof turned in the axial direction towards the base of the rotor 2. More preferably, the combustion chambers 8 are substantially cylindrical with circular cross section. In the illustrated embodiment, each inlet orifice 5 allows inserting air and fuel into the respective combustion chamber 8, whereas each exhaust duct 9 allows discharging the burnt gases coming from the respective combustion chamber 8.

Preferably, each exhaust duct 9 is shaped as an outflow nozzle, in a manner such that the burnt gases are discharged in an efficient manner through the exhaust opening 6, in order to obtain the transverse (or tangential) thrust on the rotor 3. For example, the nozzle defined by each of the exhaust ducts 9 diverges towards the outside of the rotor 3.

Preferably, the exhaust duct 9 leads to the lateral periphery or surface of the rotor 3.

Advantageously, but not necessarily, the mounting between the stator 2 and the rotor 3 occurs by means of the use of a suitable support 7 coinciding with the rotation axis X-X.

Preferably, the inlet opening comprises a curved slit or slot 1 being extended for at least a section of the circular path completed by the inlet orifices 5 during the rotation of the rotor 3. Unlike that visible in FIG. 1, the curved slit or slot 1 can have a width that is less than the width or diameter of the inlet orifices 5. Alternatively, the inlet opening can be a hole with circular cross section.

In the illustrated embodiment, the engine also comprises a trigger system configured for starting combustion in the combustion chamber 8. Preferably, the trigger system comprises a trigger device 12, of per se known type, situated on the stator 2, e.g. on the base of the latter, in a manner so as to periodically face—and generate a spark—at each of the inlet orifices 5. For example, the trigger device 12 is a spark plug. Clearly, in further variants of the invention, the trigger system can be absent, for example for configurations which do not require a controlled ignition of the air/fuel mixture.

In the illustrated embodiment, the engine also comprises an injector system configured for inserting a fuel in the combustion chambers 8. Preferably, the injector system comprises an injector device 13, of per se known type, situated on the stator 2, for example on the base of the latter, in a manner such that it periodically faces—and inserts the fuel—at each of the inlet orifices 5.

Preferably, the trigger device 12 is situated close to the injector device 13, in a manner such to form a group or set intended to cause combustion in each of the combustion chambers 8.

According to an alternative embodiment of the invention, the stator 2 has a plurality of inlet openings 1 distributed on the stator 2 itself, the injector system comprises a plurality of injector devices 13 distributed on the stator 2, and the stator 2 comprises a plurality of exhaust openings 6 distributed on the stator 2 itself. In accordance with the rotation direction of the rotor 3 in the stator 2 around the rotation axis X-X, a succession is defined in which each of the inlet openings 1 is followed by an associated injector device 13, which in turn is followed by a corresponding exhaust opening 6. Advantageously, the injector devices 13 are situated and distributed on the base of the stator 2, e.g. they are angularly equidistant from each other with respect to the rotation axis X-X. Preferably, the inlet openings 1 are distributed on the base of the stator 2, e.g. they are angularly equidistant with respect to the rotation axis X-X. Optionally, the exhaust openings 6 are distributed along the lateral surface of the stator 2, e.g. angularly equidistant with respect to the rotation axis X-X. In this manner, the engine can generate simultaneous combustion in several combustion chambers 8, increasing the propulsion in a transverse or tangential direction of the rotor 3. Indeed, each succession with inlet opening 1, injector device 13 and exhaust opening 6 defines a complete combustion cycle every time that each inlet orifice 5, the associated combustion chamber 8 and the associated discharge orifice 4, respectively, cross the aforesaid succession during the rotation of the rotor 3.

Preferably, the trigger system comprises a plurality of trigger devices 12 distributed on the stator 2. In accordance with the rotation direction of the rotor 3, in the above-defined succession, each trigger device 12 is preceded by an associated injector device 13 and is followed by a corresponding exhaust opening 6. Advantageously, the trigger devices 12 are situated and distributed on the base of the stator 2, e.g. they are angularly equidistant from each other with respect to the rotation axis X-X. In this manner, when the engine is configured for causing a controlled ignition of the air/fuel mixture, the trigger devices 12 constitute a completion of the aforesaid successions so that they determine complete combustion cycles. Therefore, each of the trigger devices 12 and each of the injector devices 13 are arranged close to each other in a manner such to form a plurality of groups or sets intended to cause simultaneous combustion in multiple combustion chambers 8.

In an optional manner, the combustion chambers 8 of the rotor 3 can be made of a material that is resistant to high temperatures, for example ceramic material. In this case, the rotor 3 provides for a plurality of seats obtained at its face turned in an axial direction towards the base of the rotor 3. In each seat, a component is fixedly mounted which is made with the aforesaid material resistant to high temperatures; such component is complementary to the seat and has an associated combustion chamber 8. Preferably, such component also includes a corresponding inlet orifice 5 and a respective exhaust duct 9 associated with the same combustion chamber 8. In this manner, the rotor 3 can be manufactured with a more economical material, with lower heat resistant properties (e.g. aluminum), while only the aforesaid components inserted in the abovementioned seats are manufactured with a more expensive material, with improved heat resistant properties (e.g. ceramic material).

The functioning of the engine illustrated in FIGS. 1 and 2 will now be described.

In operating conditions of the engine, the air is sucked and compressed by the compressor and crosses the stator 2 at the inlet opening 1. In an initial suction step, the compressed air is thus introduced into each combustion chamber 8 through the inlet orifice 5, which during the rotation of the rotor 3 faces the inlet opening 1 from time to time. In this operating step, the corresponding exhaust duct 9 faces the internal surface of the stator 2 (in particular at the lateral wall or surface thereof) and its outlet is closed in a fluid-tight manner due to the presence of the respective seal member 11.

During the rotation of the rotor 3, in a subsequent combustion step, the same inlet orifice 5 moves beyond the inlet opening 1 and reaches the region where the injector system and—possibly—the trigger system are situated. In addition, the corresponding exhaust duct 9 still faces the internal face of the stator, and therefore remains closed in a fluid-tight manner. In this manner, fuel is injected into the combustion chamber and—possibly—combustion is triggered at constant volume by means of the trigger system.

In a final exhaust step, during the rotation of the rotor, the same exhaust duct 9 reaches the region of the exhaust opening 6, while the associated inlet orifice 5 faces the internal surface of the stator 2 (in particular on its base) and is therefore closed in a fluid-tight manner due to the seal member 10. In this manner, the exhaust duct 9 is free to discharge the burnt gases, discharging all of their pressure caused by the combustion at constant volume and consequently generating the transverse or tangential thrust of the rotor 3.

The aforesaid steps of suction, combustion and discharge are repeated each time for each combustion chamber 8 during the rotation of the rotor 3.

The variant is considered in which there are multiple successions in the rotor 3, defined by an inlet opening 1, a successive injector device 13, a possible trigger device 12 and an exhaust opening 6. In this case, during the rotation of the rotor 3, each time that each inlet orifice 5, the associated combustion chamber 8 and the associated discharge orifice 4 cross, in order, the inlet opening 1, the injector device 13 (possibly coupled with the trigger device 12) and the exhaust opening 6, respectively, belonging to one of the aforesaid successions, a complete combustion cycle occurs. Consequently, during a complete rotation of the rotor 3, each of the combustion chambers 8 "crosses" each of the successions, and at the end of each of such successions it generates a transverse or tangential thrust on the rotor 3.

Below, several advantages and optional characteristics of the present invention will be described.

From the thermodynamic standpoint, there are the advantages of having combustion at constant volume, which is well known to have the greatest yield; it can also reach the maximum pressure possible in the chamber, given the same inlet flow. In addition, the fuel injection is metered over a specific air volume and is adjustable as in a piston engine; other adjustments are then possible, such as the lamination of the pressure, the variation of the temperature, the variation of the fluid flow rate, the variation of the revolutions of the compressor, etc.

All of the above can contribute to obtaining lower consumption and more power given the same air flow rate, optimal combustion conditions with greater efficiency, and the possibility of power regulation similar to the piston engines, even if revolving at the typical turbine rotation speed.

A possible regulation of the fuel is carried out with a typical regulator, connected with the rotor 3, in which there are the same number of small pistons as there are combustion chambers 8 and the alternating motion is given by a static cam on which the rods of the small pistons slide during the rotary motion; the regulated, pressurized fuel is thrust into an injector 13 for each combustion chamber 8, by acting in the appropriate step of the revolution. Or, if the speed allows it, one can place only one injector 13 in the stator 2, in the inlet opening 1, and spray towards the rotor 3: thus, one can also simplify the injector system, where it is convenient to do so.

In another case, the combustion chambers 8 are arranged in the stator 2, so that in addition to all that stated above, the rotor 3 allows and controls the opening and closing of the combustion chamber 8 openings, in order to allow the inflow of the compressed air, close the openings for combustion and finally connect them to the exhaust ducts 9 in the rotor 3.

The combustion step occurs in every volume, either inserted inside the rotor 2 or in the stator 2, and closed by the surfaces of the opposite part, in front of the inlet orifices 5 and in front of the exhaust duct 9, where the seal members 10, 11 prevent the loss of pressure inside the air space present between the rotor 3 and the stator 2. As already mentioned above, the seal members 10, 11 for example comprise gaskets or piston rings arranged for sliding on the surfaces of the stator 2, and being suitably resistant to sliding and lubricated. It is also possible to use, as seal members 10, 11, labyrinth seals or rings, thus attenuating the scraping between the parts.

As specified above, there are of course no controlled openings, such as valves or other parts in alternating motion, except for the small pistons of the fuel regulator and the usual switches of the electrical installations when necessary.

The cooling of the rotor and stator surface is carried out with the compressed air which exits from the exhaust opening 6 of the stator 2, which continuously enters into the air space with the rotor 3, in addition to entering into the combustion chambers 8 when they are situated in front of the inlet opening 1; the compressed air circulates inside the chambers and exits from the exhaust opening 6 of the stator 3, diluting the burnt gases. Other, fresher air can also be operated, on the outer surface of the rotor 3, by means of suitable fins, or with fans, which can suck air from a duct with closure valve, in a manner so as to adjust the quantity thereof for the optimal process of temperature maintenance on the rotor 3. All the cooling air can be used in the exhaust opening 6, in a manner so as to lower the temperature and to complete the processes of oxidation of the possible unburnt products.

For example, it is also possible to introduce a regeneration, by exchanging the heat of the burnt gases towards the compressed air which is directed towards the stator 2, in order to further increase the performances and the energy savings of the engine.

In addition, one can utilize the kinetic energy through the exhaust opening 6 for compressing the air flowing into the compressor, as is used in the turbo-compressed piston engines; or, one can design a rotor 3 which drives its compressor while the exhaust gases are used for providing energy to the user over a power turbine, or another jet rotor, suitably adapted for such purpose, or such gases can be used inside a duct suitable for creating thrust, as in turbojets.

Naturally, the principle of the invention remaining unchanged, the embodiments and details can be widely varied with respect to that described and illustrated as a merely non-limiting example, without departing from the scope of the invention as defined by the enclosed claims.

The invention claimed is:

1. A rotary type internal combustion engine, comprising:
    a stator including at least one stator inlet opening intended to admit an operating fluid flow, and at least one stator exhaust opening intended to discharge burnt gases; and
    a rotor mounted in said stator in a fluid-tight manner and rotatable with respect to said stator around a rotation axis, said rotor having:
        at least one rotor inlet orifice oriented in an axial direction and intended to face said stator inlet opening in a manner such to receive said operating fluid flow when it is situated at said stator inlet opening, at least one combustion chamber communicating with said at least one rotor inlet orifice, and
        at least one rotor exhaust duct having a discharge orifice; wherein said at least one rotor exhaust duct leads in a transverse direction from said at least one combustion chamber to a periphery of said rotor to discharge burnt gases through said stator exhaust opening when said rotor exhaust duct is situated at said at least one stator exhaust opening,
    wherein said at least one rotor inlet orifice, said at least one combustion chamber and said at least one rotor exhaust duct are arranged for always being in fluid communication with each other during the rotation of said rotor without the interposition of valve means situated among them, and
    wherein said engine also includes seal means arranged for sealing said at least one rotor inlet orifice and the discharge orifice of said at least one rotor exhaust duct when said sealing means face the internal surface of said stator and for clearing said at least one rotor inlet orifice and the discharge orifice of said at least one rotor exhaust duct respectively when said at least one rotor inlet orifice faces said at least one stator inlet opening and, when the discharge orifice of said at least one rotor exhaust duct faces said at least one stator exhaust opening, said seal means surround said at least one rotor inlet orifice and the discharge orifice of said at least one rotor exhaust duct.

2. The engine according to claim 1, wherein said seal means comprise a gasket which surrounds said at least one rotor inlet orifice and a gasket which surrounds said discharge orifice of the rotor exhaust duct.

3. The engine according to claim 2, wherein said gasket/gaskets comprise a material that is resistant to friction and heat.

4. The engine according to claim 2, wherein said gasket/gaskets comprise piston rings.

5. The engine according to claim 2, wherein said gasket/gaskets comprise a labyrinth type seal/seals.

6. The engine according to claim 1, further comprising a plurality of rotor inlet orifices, a corresponding plurality of combustion chambers and a corresponding plurality of rotor exhaust ducts, each of said rotor inlet orifices communicating with a respective combustion chamber among said combustion chambers which in turn communicates with a respective rotor exhaust duct among said rotor exhaust ducts.

7. The engine according to claim 1, wherein said rotor has a disc shape rotatably mounted in the cavity defined by said stator.

8. The engine according to claim 1, wherein said rotor has a central hub coupled with said stator in a rotatable manner around said rotation axis, and a peripheral ring bearing said at least one rotor inlet orifice, said at least one combustion chamber and said at least one rotor exhaust duct, said central hub and said peripheral ring being connected with each other by a plurality of radial spokes.

9. The engine according to claim 1, wherein said stator inlet opening comprises a curved slot being extended for at least a section of the circular path completed by said rotor inlet orifices.

10. The engine according to claim 1, further comprising trigger means configured for starting a combustion in said at least one combustion chamber.

11. The engine according to claim 10, further comprising injector means configured for inserting a fuel into said at least one combustion chamber.

12. The engine according to claim 11, wherein said stator has a plurality of stator inlet openings distributed on said stator, said injector means comprise a plurality of injector devices distributed on said stator and said stator comprises a plurality of stator exhaust openings distributed on said stator; in accordance with the rotation direction of said rotor in said stator, a succession being defined in which each of said stator inlet openings is followed by an associated injector device which in turn is followed by a corresponding stator exhaust opening.

13. The engine according to claim 12, wherein said trigger means comprise a plurality of trigger devices distributed on said stator; in accordance with the rotation direction of said rotor, in said succession each trigger device being preceded by an associated injector device and being followed by a corresponding stator exhaust opening.

14. The engine according to claim 13, wherein said stator inlet openings, said injector devices, said rotor exhaust openings and said trigger devices are arranged in positions which are angularly equidistant from each other with respect to said rotation axis.

15. The engine according to claim 1, wherein said at least one rotor exhaust duct has a nozzle shape which diverges towards the outside of said rotor.

* * * * *

UNITED STATES PATENT AND TRADEMARK OFFICE
CERTIFICATE OF CORRECTION

PATENT NO.        : 8,763,358 B2
APPLICATION NO.   : 13/579579
DATED             : July 1, 2014
INVENTOR(S)       : Rocco Luigi Bubbico It is certified that error appears in the above-identified patent and that said Letters Patent is hereby corrected as shown below:

On the Title Page, item (30), Foreign Application Priority Data: "TO2010A0135" should read -- TO2010A000135 --

Signed and Sealed this
Seventh Day of October, 2014

Michelle K. Lee
*Deputy Director of the United States Patent and Trademark Office*